United States Patent
Kumar et al.

(10) Patent No.: US 10,408,912 B2
(45) Date of Patent: *Sep. 10, 2019

(54) METHOD AND SYSTEM FOR DETECTING THAT AN OBJECT OF INTEREST HAS RE-ENTERED A FIELD OF VIEW OF AN IMAGING DEVICE

(71) Applicant: Xerox Corporation, Norwalk, CT (US)

(72) Inventors: Jayant Kumar, Webster, NY (US); Qun Li, Webster, NY (US); Edgar A. Bernal, Webster, NY (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,601

(22) Filed: Mar. 23, 2018

(65) Prior Publication Data

US 2018/0217223 A1 Aug. 2, 2018

Related U.S. Application Data

(63) Continuation of application No. 14/619,602, filed on Feb. 11, 2015, now Pat. No. 10,042,031.

(51) Int. Cl.
*G01S 3/786* (2006.01)
*G06T 7/20* (2017.01)
*G06K 9/00* (2006.01)
*G06K 9/32* (2006.01)

(52) U.S. Cl.
CPC ........ *G01S 3/7864* (2013.01); *G06K 9/00771* (2013.01); *G06T 7/20* (2013.01); *G06K 2009/3291* (2013.01)

(58) Field of Classification Search
CPC ...... H04N 5/23293; G06T 2207/10016; G06T 7/20

See application file for complete search history.

(56) References Cited

U.S. PATENT DOCUMENTS

| 5,491,759 A | 2/1996 | Nagao et al. |
| 6,005,683 A | 12/1999 | Son et al. |
| 6,323,898 B1 | 11/2001 | Koyanagi et al. |

(Continued)

OTHER PUBLICATIONS

Hartley, Richard I., "Self-Calibration from Multiple Views with a Rotating Camera", Computer Vision-ECCV'94. Springer Berlin Heidelberg, 1994, pp. 471-478.

(Continued)

*Primary Examiner* — Rebecca A Volentine
(74) *Attorney, Agent, or Firm* — Fox Rothschild LLP

(57) ABSTRACT

A mobile electronic device processes a sequence of images to identify and re-identify an object of interest in the sequence. An image sensor of the device, receives a sequence of images. The device detects an object in a first image as well as positional parameters of the device that correspond to the object in the first image. The device determines a range of positional parameters within which the object may appear in a field of view of the device. When the device detects that the object of interest exited the field of view it subsequently uses motion sensor data to determine that the object of interest has likely re-entered the field of view, it will analyze the current frame to confirm that the object of interest has re-entered the field of view.

23 Claims, 6 Drawing Sheets

(56) References Cited

U.S. PATENT DOCUMENTS

| | | |
|---|---|---|
| 6,922,487 B2 | 7/2005 | Dance et al. |
| 7,016,536 B1 | 3/2006 | Ling et al. |
| 7,760,908 B2 | 7/2010 | Curtner et al. |
| 8,331,685 B2 | 12/2012 | Pettigrew et al. |
| 2003/0086615 A1 | 5/2003 | Dance et al. |
| 2006/0033967 A1 | 2/2006 | Brunner |
| 2006/0227997 A1 | 10/2006 | Au et al. |
| 2007/0139722 A1 | 6/2007 | Jordan et al. |
| 2008/0002857 A1 | 1/2008 | Tsunashima |
| 2009/0115865 A1 | 5/2009 | Kamada et al. |
| 2010/0321505 A1 | 12/2010 | Kokubun |
| 2011/0066375 A1 | 3/2011 | France et al. |
| 2011/0151837 A1 | 6/2011 | Winbush, III |
| 2012/0026364 A1 | 2/2012 | Kuma |
| 2012/0051658 A1 | 3/2012 | Tong et al. |
| 2012/0105647 A1 | 5/2012 | Yoshizumi |
| 2012/0113307 A1 | 5/2012 | Watanabe et al. |
| 2012/0249554 A1 | 10/2012 | Chen et al. |
| 2013/0022231 A1 | 1/2013 | Nepomniachtchi et al. |
| 2013/0085935 A1 | 4/2013 | Nepomniachtchi et al. |
| 2013/0120641 A1 | 5/2013 | Nagaoka |
| 2013/0155226 A1 | 6/2013 | Lee et al. |
| 2014/0152849 A1 | 6/2014 | Bala et al. |
| 2014/0253737 A1* | 9/2014 | Kempinski ............... G06T 7/20 348/169 |
| 2014/0267803 A1 | 9/2014 | Shintani et al. |
| 2015/0049948 A1 | 2/2015 | Bala |
| 2015/0054975 A1 | 2/2015 | Emmett et al. |
| 2015/0178953 A1 | 6/2015 | Gao et al. |
| 2015/0179219 A1 | 6/2015 | Gao et al. |
| 2015/0199566 A1 | 7/2015 | Moore et al. |
| 2015/0248586 A1 | 9/2015 | Gaidon et al. |
| 2015/0334293 A1 | 11/2015 | Jeung |
| 2016/0063727 A1* | 3/2016 | Gao .................. G06K 9/00335 382/103 |

OTHER PUBLICATIONS

Berdugo et al., "Object Reidentification in Real World Scenarios Across Multiple Non-Overlapping Cameras", 18th European Signal Processing Conference (EUSIPCO-2010) Aalborg, Denmark, Aug. 23-27, 2010.

* cited by examiner

METHOD AND SYSTEM FOR DETECTING THAT AN OBJECT OF INTEREST HAS RE-ENTERED A FIELD OF VIEW OF AN IMAGING DEVICE

RELATED APPLICATIONS AND CLAIM OF PRIORITY

This patent document is a continuation of, and claims priority to, U.S. patent application Ser. No. 14/619,602, filed Feb. 11, 2015. The disclosure of the priority document is fully incorporated into this document by reference.

BACKGROUND

Understanding human activities from video is a fundamental problem in computer vision. With the advent of mobile video cameras that may be carried or worn by a user or placed on transportation devices, there is significant interest in the development of devices with egocentric video capture capabilities. Examples of such cameras include those that are integrated into smartphones, those incorporated into wearable devices such as glasses and goggles, body cameras such as those used for law enforcement applications, or cameras that may be mounted on headgear, bicycles, cars and trucks, or other moveable objects.

As the user of a wearable or mountable device moves, the user may want to keep track of the location of a particular object as the object moves into and out of the camera's field of view. However, processing each frame of the video to identify the object can be computationally intensive. Additional issues can occur when the user moves such that the object is no longer within the device's field of view.

This document describes methods and devices that are directed to solving at least some of the issues described above.

SUMMARY

In an embodiment, an image tracking system includes an image sensing device, a processor, and a non-transitory computer-readable memory with programming instructions configured to cause the processor to process a sequence of images received from the image sensing device and determine when an object of interest leaves and re-enters a field of view of the device. The image sensor may receive a sequence of images of an environment, and the processor may process the image sequence to detect a stationary object of interest in a first frame of the sequence. The processor may perform this detection in various ways, such as by extracting characteristics from the first frame and using a machine learning technique to use the specified features to determine the presence of the object of interest. In addition or alternatively, the system may receive, from the user via a user interface, an input that identifies the object of interest.

The processor also may receive, from a motion sensor of the device, one or more positional parameters that the motion sensor detected concurrently when the image sensor captured the first image. It may then use the received parameters to determine a range of positional parameters within which the object of interest may appear in a field of view of the image sensor. For example, the system may derive a model by relating the location of the object within the first frame to positional parameters of the motion sensor, and by analyzing subsequent frames to relate location to the object to positional parameters for those frames, and by including the relations in the model. The system may continue to monitor subsequent frames to determine whether the object is still in, or whether the object has exited, the field of view.

Optionally, while the object is still within the field of view, the system may continue to receive positional parameters for the subsequent frames, and it may update its model with newly collected data. After the system detects that the object of interest exited the field of view, it may then monitor the output of the motion sensor, and it may use the monitored output and the determined range of positional parameters to identify when the object of interest has likely re-entered the field of view.

As noted above, after identifying the object of interest in the first image, the system may execute a tracking application by continuing to track the object of interest in subsequent frames of the sequence. After detecting that the object of interest exited the field of view, the system may pause the tracking application until the processor determines that the object of interest has likely re-entered the field of view. After determining that the object of interest has re-entered the field of view and/or confirming such action, the system may resume tracking the object of interest.

Optionally, determining whether the object of interest has likely re-entered the field of view may also include determining a likely-re-entry location of the object of interest within the field of view, and applying an object detection method to the likely re-entry location. The object detection method may be frame analysis, manual input, or a combination of the two as discussed elsewhere in this document. Similar methods may be used to determine when the object of interest is no longer in the field of view.

After determining that the object of interest has likely re-entered the field of view, the system may confirm that the object has re-entered the field of view. The system may do this by any suitable method, such as by receiving an input from a user, or automatically using a frame analysis application that applies a frame analysis method to detect the object of interest within the subsequent frame such as: (i) image analysis to detect the object of interest within the second frame; or (ii) a template matching technique.

At any point in the process, the system may cause a display of the electronic device to output the field of view and display a virtual marker on the field of view.

Optionally, when determining the range of positional parameters within which the object of interest may appear in the field of view of the device, the system may determine a rotational span within which the object of interest will appear, and it may determine a range of pitch values and yaw values that correspond to the determined field of view. The system may then use the output of the motion sensor and the determined range of positional parameters to determine whether the object of interest has likely re-entered the field of view by: (i) determining whether positional parameters received from the motion sensor comprise current pitch and yaw values that are within the determined range of pitch values and yaw values; and (ii) when the current pitch and yaw values are within the determined range of pitch values and yaw values, concluding that the object of interest is likely to be within the field of view, otherwise concluding that the object of interest is outside of the field of view. The system also may determine a likely-re-entry location of the object of interest within the field of view by applying differences between the current pitch and yaw values and those of an image origin, as well as a difference between a current roll value and a roll value of an image origin, to a learned regression model to predict the likely re-entry location with respect to an image origin.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" is a device that includes one or more electronic hardware components, such as a processor; non-transitory, computer-readable memory; an image sensor, a transmitter; a display; and/or other components. The memory may contain programming instructions in the form of firmware or a software application. When executed by the processor, the instructions cause the device to perform various operations according to the programming instructions. Examples of suitable devices include smart phones, personal digital assistants, digital video cameras, and the like. In various embodiments, wearable or attachable electronic devices with image sensors may be used. Examples include wearable systems such as glasses, goggles, headgear-mounted cameras, body cameras and other wearable cameras, and smart watches. Other examples include electronic devices that may be mounted on or integral with human-powered or powered vehicles, such as mountable cameras that may be used with bicycles, motorcycles, cars and trucks, unmanned aerial vehicles and the like.

An "image sensor" refers to a device that is capable of optically viewing an environment and converting a visual representation of that environment into electronic signals and data. One such example of an image sensor is a digital video camera. A "video acquisition module" refers to the image sensor hardware of an electronic device along with software that a processor uses to process the received images.

The term "module" refers to hardware, programming instructions embodied in software or firmware, or a combination of hardware and programming instructions that work together to perform a described function. One or more hardware elements such as processors may be shared among multiple modules. Similarly, one or more programming instruction portions, such as subroutines or libraries, may be shared among multiple modules.

Figure 1:
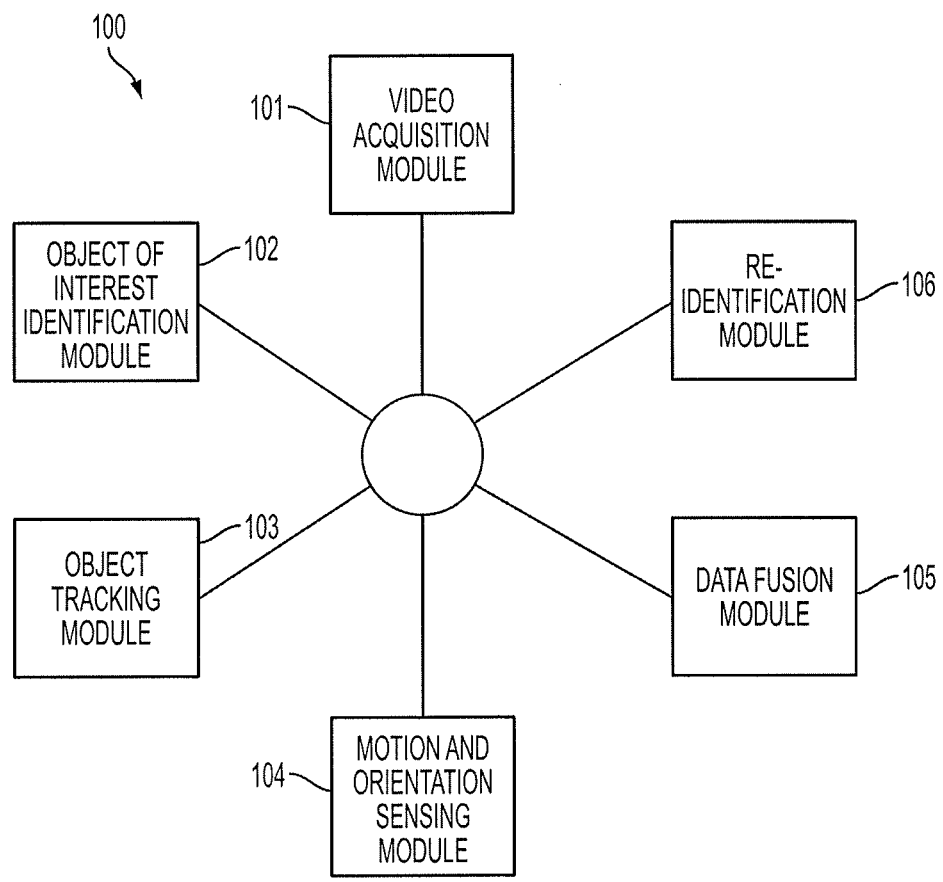
FIG. 1 illustrates various components of a system for detecting and tracking an object of interest as it exits and re-enters a field of view.

FIG. 1 illustrates various components of a system 100 for detecting, and tracking an object of interest as it exits and re-enters a field of view. The system may include components such as a video acquisition module 101, which will include an image sensor that is capable of acquiring and processing a sequence of images. In some embodiments, the video acquisition module 101 may be an egocentric device in that it is wearable and/or acquires video of an environment in which the wearer is present.

The system also may include an object of interest identification module 102 that includes programming instructions that are configured to instruct a processor to identify an object in an initial frame of the video sequence. In some embodiments, the object of interest identification module 102 is configured to cause the processor to automatically identify the object, such as by processing the image and detecting objects having one or more specified characteristics such as size, shape, texture or color. Any now or hereafter known object detection technique may be used. In other embodiments, the object of interest identification module 102 may include a user interface via which the system may receive a manual identification of the object of interest. Example configurations of a user interface may be a touch screen, a keyboard, a microphone and natural language recognition interface, or the like.

Once the object of interest identification module 102 identifies an object of interest, it may process the image of the object to extract data representing one or more characteristics of the object and use that characteristic data to identify and track the object in future frames of the video sequence. Examples of such characteristics may include color histograms, Harris corners, histograms of oriented gradient (HOG) features, scale-invariant feature transform (SIFT) points, Haar-like features, a Fisher kernel, maximally stable extremal regions (MSER) features, and the like.

The system also may include an object tracking module 103 that includes programming instructions configured to enable the processor to track a previously-identified object of interest as it moves within a field of view of the image sensor. The concept of "moving within a field of view" generally refers to circumstances of operation in which the image sensor moves, but the object of interest is stationary or substantially stationary (i.e., to the extent that it moves, its motion is insignificant when compared to motion of the image sensor). Thus, the object is a stationary or substantially stationary object that appears at various x,y coordinates in various frames of the captured video sequence. For example, if the image sensor is contained in wearable headgear, in eyeglass or goggle frames, or in a body camera, then as the wearer moves the object will also move to various x,y coordinates within the frame sequence. When the wearer moves the image sensor so that the object is out of the field of view, then the object will not appear in the frame sequence. Thus, apparent motion of the object in the video stream may be caused by motion of the person or machine that contains the image sensor (and with it, motion of the video acquisition device), motion of the object within the scene, or a combination of both. Tracking the apparent motion pattern of the object may provide cues that are relevant to the type of subject-object interaction that takes place, which, in turn, may provide useful discriminative cues for action recognition.

Examples of video-based object tracking algorithms that the object tracking module 103 may use include mean-shift tracking, point and global feature-based, silhouette/contour, and particle filter trackers, among other algorithms. Thus, in some embodiments an object tracking module may be considered a frame analysis module as it analyzes data corresponding to the image sequence frames. The object tracking module may output spatio-temporal information describing the location of the detected object across the range of frames in which it is present within the field of view of the image sensor. For example, the tracking module 103 may output the location of an object that is being tracked as a set of pixel coordinates (e.g., x,y) and, for each coordinate set, a corresponding frame number or other identifier for each frame in which the object remains within the field of view of the image sensor.

Figure 2A:
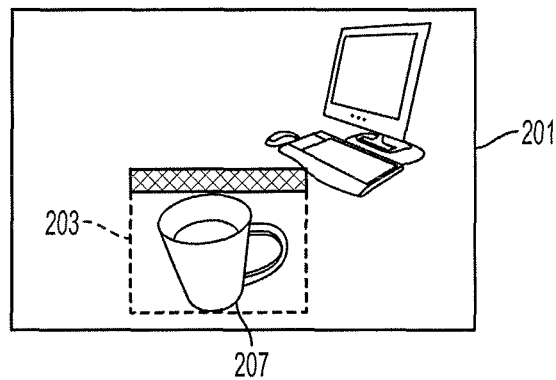
FIGS. 2A-2C show three different frames of an example image sequence that contains an object of interest.
Figure 2B:
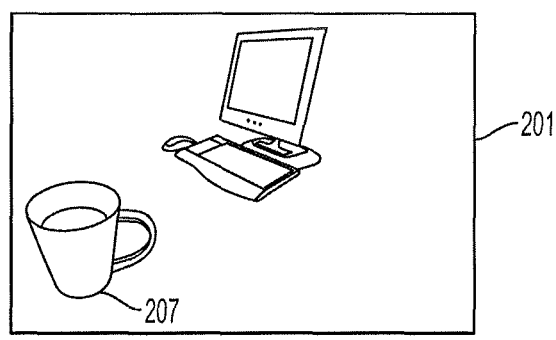
Figure 2C:
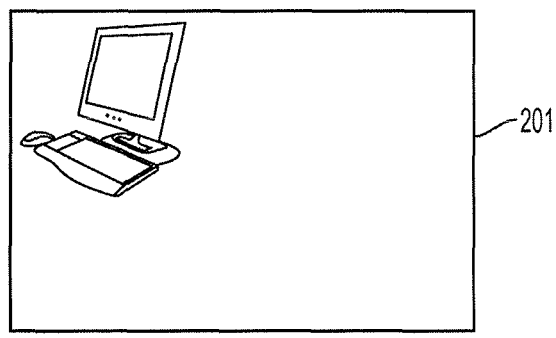

FIGS. 2A-2C show three different frames of a video in which a head-mounted electronic device detects and tracks an object of interest 207 (here, a cup) in a field of view 201 of the device as the wearer pans his head from left to right. In FIG. 2A, the cup 207 appears near the center of the image. In FIG. 2B, the wearer has moved his head to the right, so the coordinates of the cup 207 move toward the left side of the field of view. In FIG. 2C, the wearer has continued to move his head to the right, and the cup no longer appears in the field of view.

In some embodiments, once the system has identified an object of interest, then when tracking the object the system may cause the display to present a visual overlay that highlights the object of interest. This presentation may be done in real time as the system outputs the captured video sequence. FIG. 2A illustrates an example of a visual overlay 203, shown as a virtual box. However, any visual overlay of any shape, size or color may be used. The system may output the visual overlay 203 at a location that corresponds to the tracked location of the object of interest 207. The visual overlay may be some type of visual marker that a viewer can see in an area of the object of interest. Examples include an arrow pointing at the object of interest, a geometric shape enclosing some or all of the object of interest, or a semi-transparent color overlay on the object of interest.

Returning to FIG. 1, the system also may include a motion and orientation sensing module 104 that includes one or more motion, acceleration and orientation sensors that are configured to detect and output data corresponding to motion and orientation of a device. The sensors may be any of those that are now or hereafter known in the art. One example of such a sensor is an accelerometer, which is configured to measure magnitude and direction of acceleration relative to a free-falling frame of reference. Another example is a gyroscope, which is configured to measure the orientation of the device. Another example is a compass, which is configured to output the orientation of the device in relation to the magnetic field of the Earth. In this document, motion, acceleration and orientation sensors may each be referred to simply as "motion sensors" for simplicity. The motion and orientation sensing module 104 will be integral with the device that contains the image sensor so that the module 104 collects motion and orientation data that corresponds to that of the image sensor.

Figure 3:
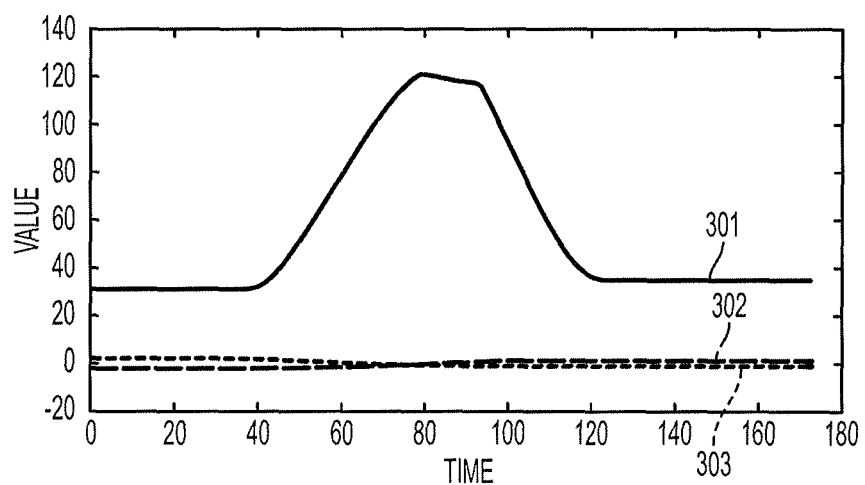
FIG. 3 illustrates examples of motion-related data that a system of the disclosed embodiments may collect over time as an image sensing device is moved.

Returning again to FIG. 1, a data fusion module 105 will perform various functions on captured data to develop parameters that may be used to determine when an object of interest that has exited a field of view may re-enter the field of view. For example, using the data collected by the motion and orientation sensors, the system may reliably and continuously obtain various types of useful information. The rotation vector is one such type of data, as it represents the orientation of the device as a combination of an angle and an axis, in which the device has rotated through an angle θ around an axis (x, y, or z). The three elements of the rotation vector are equal to the last three components of a unit quaternion (cos(θ/2), x*sin(θ/2), y*sin(θ/2), z*sin(θ/2)). Elements of the rotation vector are typically unitless. Using the sensor value, the system may obtain a rotation matrix (R) in a sensor coordinate system. The system may determine the device's orientation (yaw, pitch, roll) based on the rotation matrix. FIG. 3 illustrates examples of data that a motion and orientation sensing module may collect and/or a data fusion module may develop over time as the image sensing device is moved from left to right and back again, including yaw 301, pitch 302 and roll 303.

Figure 4:
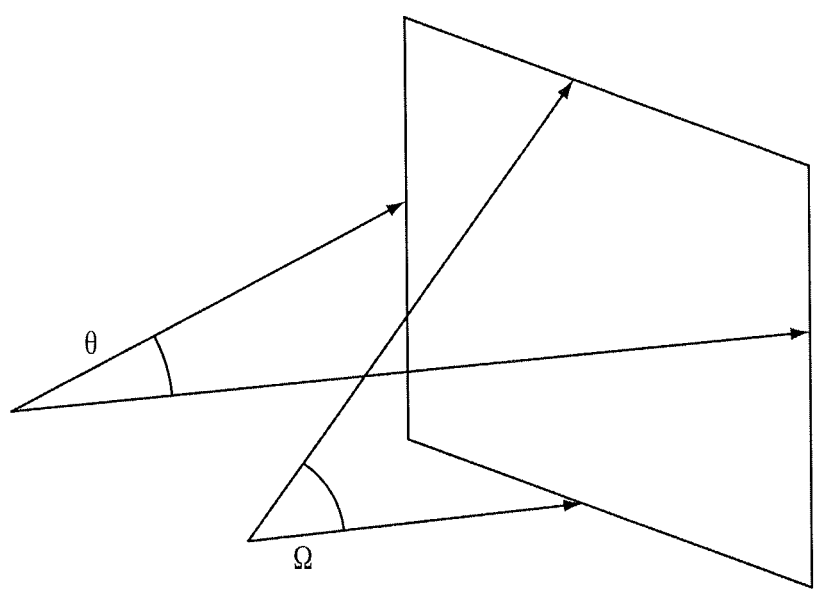
FIG. 4 shows a pictorial representation of variables that the system may estimate.

Returning again to FIG. 1, the system also may include a re-identification module 106 that includes programming instructions to determine when and where an object of interest that has left the field of view may re-enter it. The re-identification module 106 may do this in two steps: (1) determine when the object re-enters the field of view, and (2) determine the exact location of re-entering. In or prior to the first step, the system may compute the rotational span of the field of view in both the horizontal and vertical directions (i.e., the angular change it requires for a point object (a small object) to enter and exit the field with the other axis remaining fixed) in a separate step. For example, in one embodiment, specifications of the optical and electronic components of the image sensor including focal length and sensor size may be known, from which the extent of the field of view can be detected. In an alternative embodiment, an object of interest may be tracked as the image sensor is moved. The system may determine that the object leaves the field of view when the image sensor of the system detects that the object's pixel coordinates, as determined by the tracking algorithm, reach one of the edges of the image. The object coordinates of the object leaving the scene from the left, right, top and bottom of the scene, can then be paired with the positional parameters output by the motion sensors in the system to determine the span of the field of view of the image sensor. FIG. 4 shows a pictorial representation of variables (Ω, θ) that the system may estimate. For simplicity, and without loss of generality, the following example assumes that the object being tracked is initially at the center of the first frame and that the roll is constant. Once the variables (Ω, θ) are estimated, the system has a range ((Ycurr−θ/2, Ycurr+θ/2), (Pcurr−Ω/2, Pcurr+Ω/2)) to check for the object's initial sensor reading to be in the view again where (Ycurr, Pcurr) is the current sensor reading (Yaw, Pitch). The system may periodically or continuously check whether the object is within view based on the tracking information, assuming that the object is stationary. The field of view span may be computed as a function of roll (rotation along z-axis). If there is any change in the roll, the system may re-compute the field of view span. In the second step, the system may determine the relationship between the values of positional parameters of the motion sensor(s) and the corresponding locations of the object within the field of view of the image sensor. The module 106 may do this by deriving a model that relates location of the object of interest while it appears in the field of view to positional parameters of the motion sensor, and storing the model in computer-readable memory. Specifically, the system may create a look-up table relating the positional parameters of the motion sensor with coordinates describing the location of the object of interest in each frame of the image sequence while the object appears in the field of view. From this look-up table, mathematical models describing the relationship between the positional parameters of the motion sensor and the coordinates of the object of interest can be constructed via for example a regression technique. Such a regression model thus obtained may describe the relationship between both variables within and outside the range observed.

Optionally, for enhanced robustness, the system may store one or more characteristics of the object of interest extracted from one or multiple frames while it was in the field of view.

The system may store these characteristics as a template or other data set describing the object. The object tracking module may then use these characteristics to track the object, and/or confirm that it has re-entered a field of view at a later time.

When the object is outside of the field of view, the system may stop processing the image for the purpose of tracking. The search for the object may be resumed when the range of positional parameters of the motion sensors correspond to values in which the object is likely to appear in the field of view. Based on motion sensor data, the system may then process the image and search for pixels and regions in an image having characteristics that are the best match to the previously stored characteristics, the search neighborhood being centered at the location predicted by the regression model. Thus, the system need not analyze each video frame to search the previously stored characteristics of the object across every location in the image plane of each subsequent frame, regardless of whether the object is present in the field of view or not. This may help reduce errors and computational processing requirements.

Note that in the embodiments described above, the system takes an empirical data-driven approach to determine the location of re-entry in order to avoid camera calibration. In an alternative approach, the system may determine a relationship between video trajectories and the camera rotation parameters using a 3D geometric model. This may generally require some form of calibration to determine the parameters of the model. Using the rotation matrix R, the system may apply a geometric transformation (projective, affine, etc.) to estimate the new coordinates of object of interest when it is likely to have re-entered a field of view.

Optionally, all components of the system 100 may be contained in a single electronic device, such as a smartphone or wearable camera with processing capabilities. In other embodiments, the components may be distributed across multiple devices. For example, a camera may contain the image sensor, and the camera may include a transmitter or communications port that sends data captured by the sensor to a separate device for image processing. The processing device may also be a wearable or portable electronic device, such as a smartphone or tablet computing device that communicates with the camera via wired or near-field wireless communications. Alternatively, the processing device may be a cloud-based or otherwise remote processing device that directly or indirectly receives signals from and sends signals to the local components of the system.

Figure 5:
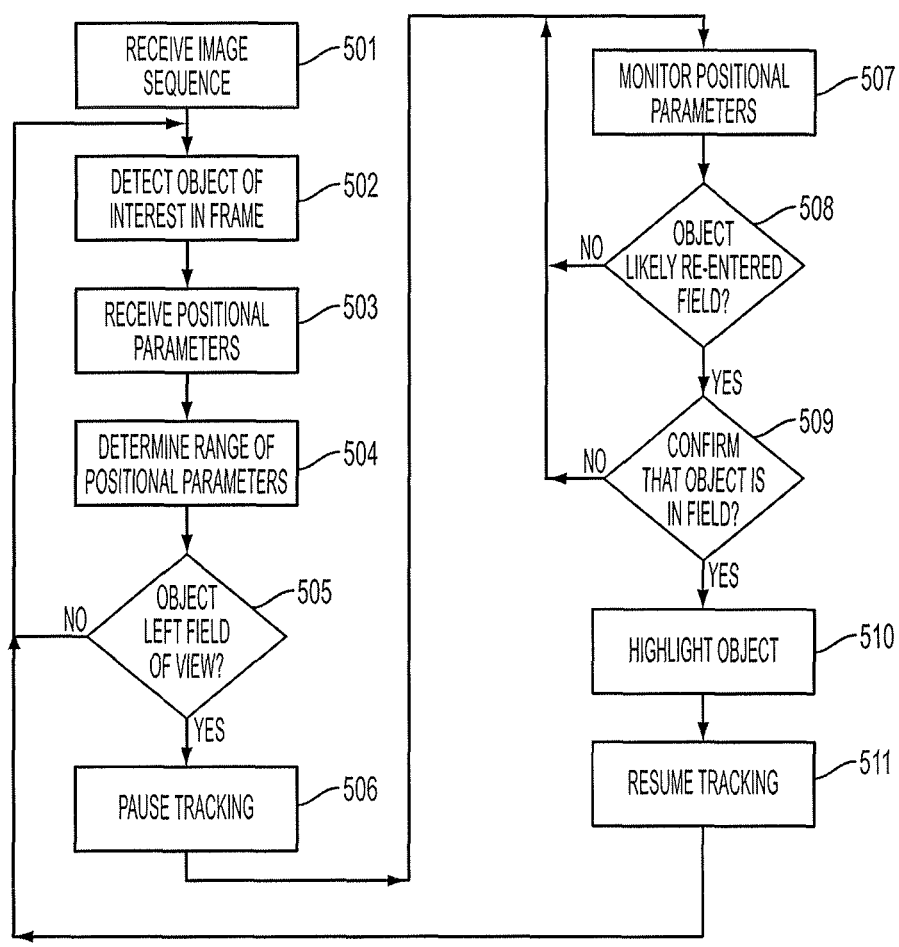
FIG. 5 is a flowchart showing steps of an image analysis process.

FIG. 5 is a flowchart illustrating various steps that an image tracking system may perform to process a sequence of images and determine when an object of interest leaves and re-enters a field of view of an electronic device, in accordance with various disclosed embodiments. At any stage in the process, an image sensor may receive a sequence of images of an environment 501.

A processor of an electronic device that contains the sensor, or of a separate device that is in electronic communication with the image sensor's device, may process the image sequence to detect a stationary (or at least substantially stationary) object of interest in a first frame of the sequence 502. The processor may perform this detection in any number of ways, such as by extracting specified features (i.e., characteristics of pixels or pixel regions) from the first frame and using a machine learning technique to use the specified features to determine the presence of the object of interest. Example data sets containing object of interest characteristics may include color histograms, Harris corners, HOG features, SIFT points, characteristics Haar-like features, a Fisher kernel, and the like. Example machine learning techniques may include Deformable parts model (DPM), support vector machine (SVM) techniques, the SNoW learning architecture, adaptive boosting techniques (AdaBoost), decision trees, clustering techniques, and others. In addition or alternatively, the system may receive, from the user via a user interface, an input that identifies the object of interest. For example, the user may use a touch screen, mouse, touch pad, or other interface to point to or draw a shape around the object.

The processor also may receive, from a motion sensor of the device, one or more positional parameters that the motion sensor detected when the image sensor captured the first image 503. It may then use the received parameters to determine a range of positional parameters within which the object of interest may appear in a field of view of the image sensor 504. For example, the system may derive a model by relating the location of the object within the first frame to positional parameters of the motion sensor, and by analyzing subsequent frames to relate location to the object to positional parameters for those frames, and by including the relations in the model. The system may extrapolate or fill in data to estimate positional parameters associated with locations for which the object does not appear in any available image. The system may continue to monitor subsequent frames to determine whether the object is still in, or whether the object has exited, the field of view 505.

Optionally, while the object is still within the field of view, the system may continue to receive positional parameters for the subsequent frames, and it may update its model with newly collected data. After the system detects that the object of interest is no longer in (i.e., exited) the field of view, it may then monitor the output of the motion sensor 507, and it may use the monitored output and the determined range of positional parameters to identify when the object of interest has likely re-entered the field of view 508. This will happen when the positional parameters of the motion sensors yield positional parameters that the model indicates correspond to positions in which the object of interest is likely to appear. For example, the received positional parameters may correspond to those for which the object appeared in past frames. Or, the received positional parameters may correspond to those for which the object is expected to appear based on interpolated, extrapolated or otherwise predicted data as indicated by the constructed model.

As noted above, after identifying the object of interest in the first image, the system may execute a tracking application by continuing to track (i.e., collect coordinates and positional data for) the object of interest in subsequent frames of the sequence. After detecting that the object of interest exited the field of view, the system may pause 506 the tracking application until the processor determines that the object of interest has likely re-entered the field of view. After determining that the object of interest has re-entered the field of view and/or confirming such action, the system may resume tracking the object of interest 511.

Optionally, determining whether the object of interest has likely re-entered the field of view may also include determining a likely-re-entry location of the object of interest within the field of view, and applying an object detection method to the likely re-entry location. The object detection method may be frame analysis, manual input, or a combination of the two as discussed elsewhere in this document. Similar methods may be used to determine when the object of interest is no longer in the field of view.

After determining that the object of interest has likely re-entered the field of view 508, the system may confirm 509 that the object has re-entered the field of view. The system may do this by any suitable method, such as by receiving an input from a user, or automatically using a frame analysis application that applies a frame analysis method to detect the object of interest within the subsequent frame such as: (i) image analysis (e.g., looking for known characteristics of the object) to detect the object of interest within the second frame; or (ii) a template matching technique.

At any point in the process, the system may cause a display of the electronic device to output the field of view and display a marker on the field of view 510. This may help the system to obtain data to identify the object of interest in initial frames, or to help the system prompt the user to confirm that an object has re-entered the frame. For example, the system may prompt the user to move the electronic device and provide an input when the marker aligns with a location of the object of interest.

Optionally, when determining the range of positional parameters within which the object of interest may appear in the field of view of the device, the system may determine a rotational span within which the object of interest will appear, and it may determine a range of pitch values and yaw values that correspond to the determined field of view. The system may then use the output of the motion sensor and the determined range of positional parameters to determine whether the object of interest has likely re-entered the field of view by: (i) determining whether positional parameters received from the motion sensor comprise current pitch and yaw values that are within the determined range of pitch values and yaw values; and (ii) when the current pitch and yaw values are within the determined range of pitch values and yaw values, concluding that the object of interest is likely to be within the field of view, otherwise concluding that the object of interest is outside of the field of view. The system also may determine a likely-re-entry location of the object of interest within the field of view by applying differences between the current pitch and yaw values and those of an image origin, as well as a difference between a current roll value and a roll value of an image origin, to a learned regression model to predict the likely re-entry location with respect to an image origin.

Figure 6:
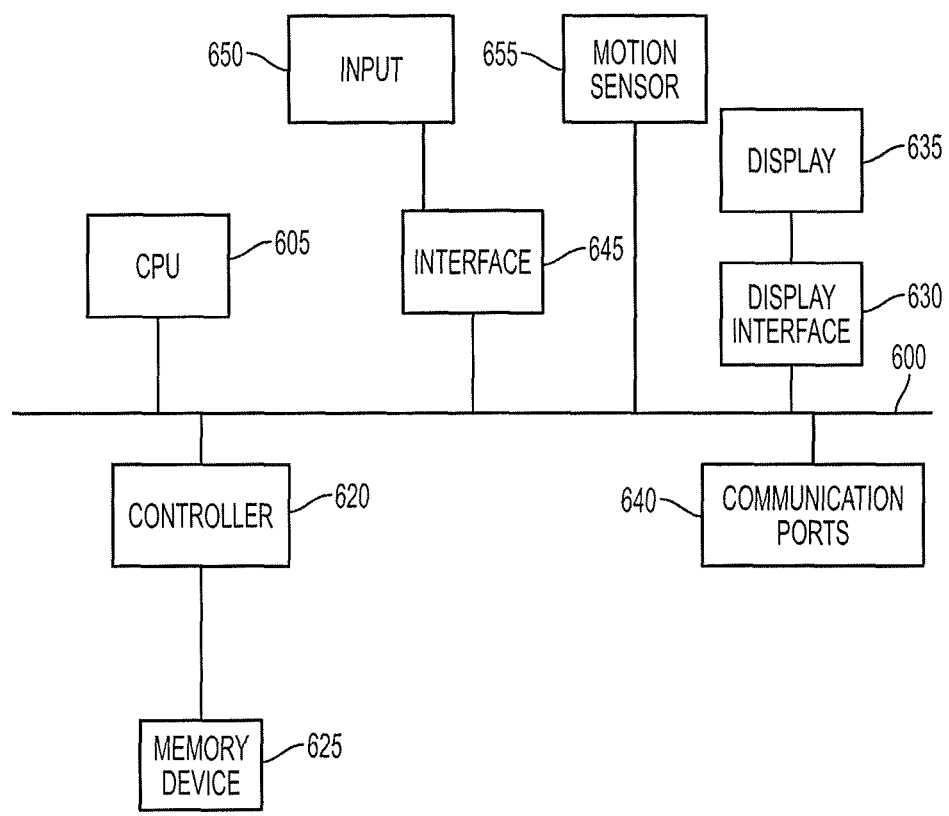
FIG. 6 is a block diagram illustrating various hardware components that an image tracking system may include or use.

FIG. 6 depicts a block diagram of hardware that may be included with various components of the systems described above. A bus 600 serves as an information path interconnecting at least some other illustrated components of the hardware. CPU 605 is a central processing unit of the system, performing calculations and logic operations required to execute a program. CPU 605, alone or in conjunction with one or more of the other elements disclosed in FIG. 6, is an example of an electronic device, computing device or processor as such terms are used within this disclosure. Unless specifically stated otherwise, the term "processor" is intended to refer to embodiments that require a single processor a single device, as well as to embodiments in which a group of processors collectively perform a function or process. A controller 620 interfaces with one or more optional non-transitory computer-readable storage media 625 to the system bus 600. Read only memory (ROM) and random access memory (RAM) constitute examples of non-transitory computer-readable storage media. Other examples include firmware, hard drives, flash drives, solid state drives and the like. Programming instructions, data and modules may be included on a single memory device, or distributed across multiple memory devices.

An optional display interface 630 may permit information to be displayed on a display 635 in visual, graphic or alphanumeric format. Communication with external devices, such as a printing device, may occur using various communication ports 640. A communication port 640 may be attached to a communications network, such as the Internet or an intranet. Or it may include a transmitter that transmits data via a wireless data network or near field communication network.

The hardware may also include an interface 645 that allows for receipt of data from an input device 650 such as a keyboard, mouse, a joystick, a touch screen, a remote control, a pointing device, a video input device and/or an audio input device. As noted above, the hardware will also include one or more motion sensors 655 such as gyroscopes or accelerometers.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A video capture and object re-identification system, comprising:
   a video acquisition module that comprises an image sensor;
   a motion sensor;
   a processor; and
   a non-transitory computer-readable medium containing programming instructions that are configured to, when executed, cause the processor to:
      receive a sequence of images from the image sensor,
      analyze the images to track an object of interest as the object of interest moves within a field of view of the image sensor;
      receive, from the motion sensor, positional parameters that the motion sensor detected concurrently with capture of the sequence of images by the video acquisition module;
      determine a range of positional parameters within which the object of interest may appear in the field of view;
      detect that the object of interest exited the field of view,
      after detecting that the object of interest exited the field of view:
         stop analyzing the images to track the object of interest;
         use an output of the motion sensor and the determined range of positional parameters to determine whether the object of interest has likely re-entered the field of view by applying differences between current pitch and yaw values detected by the motion sensor and those of an image origin, or between a current roll value detected by the motion sensor and a roll value of the image origin, to a learned regression model to predict a likely re-entry location with respect to the image origin; and
         after determining that the object of interest has likely re-entered the field of view, resume analyzing images captured by the video acquisition module to confirm that the object of interest has re-entered the field of view.

2. The system of claim 1, wherein the instructions to determine the range of positional parameters comprise instructions to derive a model that relates location of the object of interest within the sequence of images to corresponding positional parameters of the motion sensor.

3. The system of claim 1, wherein the instructions to resume analyzing images to confirm that the object of interest has re-entered the field of view comprises instructions to implement a frame analysis application that applies any of the following analysis methods:
- image analysis to detect the object of interest within additionally received images; or
- a template matching technique.

4. The system of claim 1, further comprising a wearable housing that contains the image sensor, the motion sensor, and the processor.

5. The system of claim 1, wherein the instructions to track the object of interest comprise instructions to extract specified features from one or more frames in the sequence of images and use a machine learning technique to use the specified features to identify and determine coordinates of the object of interest in each of the one or more frames.

6. The system of claim 1:
- further comprising a user interface; and
- wherein the instructions to track the object of interest comprise instructions to receive an identification of the object of interest via the user interface.

7. The system of claim 6, further comprising:
- a display; and
- additional instructions that are configured to cause the processor to cause the display to:
  - output the field of view,
  - display a marker on the field of view, and
  - prompt the user to move an electronic device that contains the display and provide the input when the marker aligns with a location of the object of interest.

8. The system of claim 1, wherein:
- the instructions to detect that the object of interest exited the field of view comprise instructions to do so when coordinates of the object of interest in one or more of the images reach an edge of the image; and
- the instructions to determine whether the object of interest has likely re-entered the field of view comprise instructions to determine that the object of interest has likely re-entered the field of view when positional parameters of the motion sensor correspond to the range of positional parameters within which the object of interest may appear in the field of view.

9. The system of claim 1, wherein:
- the instructions to determine whether the object of interest has likely re-entered the field of view also comprise instructions to determine a likely-re-entry location of the object of interest within the field of view; and
- the instructions to confirm that the object of interest has re-entered the field of view comprise instructions to analyze a portion of an image frame that corresponds to the likely re-entry location.

10. The system of claim 1, wherein:
- the instructions to determine the range of positional parameters within which the object of interest may appear in the field of view of the device comprise instructions to:
  - determine a rotational span within which the object of interest will appear in the field of view;
  - determine a range of pitch values and yaw values that correspond to the determined field of view; and
- the instructions to use the output of the motion sensor and the determined range of positional parameters to determine whether the object of interest has likely re-entered the field of view comprise instructions to:
  - determine whether positional parameters received from the motion sensor comprise current pitch and yaw values that are within the determined range of pitch values and yaw values, and
  - when the current pitch and yaw values are within the determined range of pitch values and yaw values, conclude that the object of interest is likely to be within the field of view, otherwise conclude that the object of interest is outside of the field of view.

11. The system of claim 10, wherein the instructions to determine whether the object of interest has likely re-entered the field of view also comprise instructions to determine a likely re-entry location of the object of interest within the field of view by applying differences between the current pitch and yaw values and those of an image origin, as well as a difference between a current roll value and a roll value of an image origin, to a learned regression model to predict the likely re-entry location with respect to an image origin.

12. The system of claim 1, wherein:
- the system further comprises a display; and
- the instructions further comprise instructions that are configured to cause the display to:
  - output the field of view, and
  - in real time, virtually overlay a marker that highlights a current location of the object of interest whenever the object of interest is within the field of view.

13. A method of processing a sequence of images to determine when an object of interest leaves and re-enters a field of view, the method comprising:
- by an image sensor, capturing a sequence of images of an environment;
- by a motion sensor, detecting positional parameters concurrently with the capturing of the sequence of images by the image sensor; and
- by a processor of an electronic device, executing programming instructions that cause the processor to:
  - analyze the images to track an object of interest as the object of interest moves within a field of view of the image sensor,
  - use the detected positional parameters to determine a range of positional parameters within which the object of interest may appear in the field of view,
  - detect that the object of interest exited the field of view,
  - after detecting that the object of interest exited the field of view:
    - stop analyzing the images to track the object of interest;
    - use an output of the motion sensor and the determined range of positional parameters to determine whether the object of interest has likely re-entered the field of view by applying differences between current pitch and yaw values detected by the motion sensor and those of an image origin, or between a current roll value detected by the motion sensor and a roll value of the image origin, to a learned regression model to predict a likely re-entry location with respect to the image origin; and
    - after determining that the object of interest has likely re-entered the field of view, resume analyzing images captured by the image sensor to confirm that the object of interest has re-entered the field of view.

14. The method of claim 13, wherein determining the range of positional parameters comprises, by the processor, deriving a model that relates location of the object of interest within the sequence of images to corresponding positional parameters of the motion sensor.

15. The method of claim 13, wherein resuming analyzing the images to confirm that the object of interest has re-entered the field of view comprises applying a frame analysis application that applies any of the following analysis methods:
  image analysis to detect the object of interest within additionally received images; or
  a template matching technique.

16. The method of claim 13, wherein analyzing the images to track the object of interest comprises extracting specified features from one or more frames in the sequence of images and using a machine learning technique to use the specified features to identify and determine coordinates of the object of interest in each of the one or more frames.

17. The method of claim 13, wherein tracking the object of interest comprises receiving an input from the user via a user interface, wherein the input comprises an identification of the object of interest.

18. The method of claim 17, further comprising:
  by the processor, causing a display of the electronic device to output the field of view and display a marker on the field of view; and
  prompting the user to move the electronic device and provide the input when the marker aligns with a location of the object of interest.

19. The method of claim 13, further wherein:
  detecting that the object of interest exited the field of view comprises doing so when coordinates of the object of interest in one or more of the images reach an edge of the image; and
  determining whether the object of interest has likely re-entered the field of view comprises determining that the object of interest has likely re-entered the field of view when positional parameters of the motion sensor correspond to the range of positional parameters within which the object of interest may appear in the field of view.

20. The method of claim 13, wherein:
  determining whether the object of interest has likely re-entered the field of view also comprises determining a likely-re-entry location of the object of interest within the field of view; and
  confirming that the object of interest has re-entered the field of view comprises applying object detection to the likely re-entry location.

21. The method of claim 13, wherein:
  determining the range of positional parameters within which the object of interest may appear in the field of view of the device comprises:
    determining a rotational span within which the object of interest will appear, and
    determining a range of pitch values and yaw values that correspond to the determined field of view; and
  using the output of the motion sensor and the determined range of positional parameters to determine whether the object of interest has likely re-entered the field of view comprises:
    determining whether positional parameters received from the motion sensor comprise current pitch and yaw values that are within the determined range of pitch values and yaw values, and
    when the current pitch and yaw values are within the determined range of pitch values and yaw values, concluding that the object of interest is likely to be within the field of view, otherwise concluding that the object of interest is outside of the field of view.

22. The method of claim 21, wherein determining whether the object of interest has likely re-entered the field of view also comprises determining a likely-re-entry location of the object of interest within the field of view by applying differences between the current pitch and yaw values and those of an image origin, as well as a difference between a current roll value and a roll value of an image origin, to a learned regression model to predict the likely re-entry location with respect to an image origin.

23. The method of claim 13 further comprising, by the processor, causing a display of the electronic device to:
  output the field of view; and
  in real time, virtually overlay a marker that highlights a current location of the object of interest whenever the object of interest is within the field of view.

* * * * *